(12) United States Patent
Tsunoda

(10) Patent No.: US 9,143,241 B2
(45) Date of Patent: Sep. 22, 2015

(54) EMPHASIS SIGNAL GENERATING CIRCUIT

(71) Applicant: FUJITSU LIMITED, Kawasaki (JP)

(72) Inventor: Yukito Tsunoda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 13/973,457

(22) Filed: Aug. 22, 2013

(65) Prior Publication Data

US 2014/0140708 A1     May 22, 2014

(30) Foreign Application Priority Data

Nov. 19, 2012   (JP) .................................. 2012-253724

(51) Int. Cl.
  *H04B 10/12* (2006.01)
  *H04B 10/588* (2013.01)

(52) U.S. Cl.
  CPC ..................... *H04B 10/588* (2013.01)

(58) Field of Classification Search
  CPC ...................................................... H04B 10/588
  USPC ................... 398/192, 193; 375/296
  See application file for complete search history.

(56) References Cited

U.S. PATENT DOCUMENTS

| | | | | |
|---|---|---|---|---|
| 4,992,754 | A * | 2/1991 | Blauvelt et al. ............... | 330/149 |
| 5,446,574 | A * | 8/1995 | Djupsjobacka et al. ....... | 398/147 |
| 6,519,374 | B1 * | 2/2003 | Stook et al. .................... | 385/2 |
| 6,778,730 | B2 * | 8/2004 | Hironishi ........................ | 385/24 |
| 7,312,909 | B2 * | 12/2007 | Glingener et al. ............. | 398/98 |
| 7,444,084 | B2 * | 10/2008 | Kikushima .................... | 398/202 |
| 7,945,172 | B2 * | 5/2011 | Huang et al. .................. | 398/193 |
| 8,170,424 | B2 * | 5/2012 | Cai ................................. | 398/201 |
| 8,582,984 | B2 * | 11/2013 | Kai ................................ | 398/196 |
| 2004/0113656 | A1 | 6/2004 | Sato | |
| 2005/0001684 | A1 * | 1/2005 | Braithwaite .................. | 330/263 |
| 2005/0191059 | A1 * | 9/2005 | Swenson et al. ............. | 398/159 |
| 2009/0086303 | A1 * | 4/2009 | Ide et al. ........................ | 359/279 |
| 2009/0141333 | A1 * | 6/2009 | Tsunoda et al. .............. | 359/279 |

(Continued)

FOREIGN PATENT DOCUMENTS

| | | |
|---|---|---|
| JP | 2004-88693 | 3/2004 |
| JP | 2012-44396 | 3/2012 |
| JP | 2013-74438 | 4/2013 |

OTHER PUBLICATIONS

Tsunodat et al; 25-Gb/s transmitter for optical interconnection with 10-Gb/s VCSEL using dual peak-tunable pre-emphasis; Mar. 6-10, 2011; OSA/OFC/NFOEC.*

(Continued)

*Primary Examiner* — Ken Vanderpuye
*Assistant Examiner* — Amritbir Sandhu
(74) *Attorney, Agent, or Firm* — Staas & Halsey LLP

(57) ABSTRACT

An emphasis signal generating circuit includes: a branch circuit configured to split a signal into a plurality of paths; a delay circuit provided in one or more of the paths into which the signal has been split by the branch circuit, the delay circuit being configured to delay one or more signals; a phase compensation circuit provided in one or more of the paths into which the signal has been split by the branch circuit, the phase compensation circuit having such characteristics that a transmission intensity of a signal is low in a low frequency band and is high in a high frequency band; and an addition/subtraction circuit configured to perform addition and/or subtraction of signals from the plurality of paths and output a result.

9 Claims, 17 Drawing Sheets

(56) References Cited

U.S. PATENT DOCUMENTS

| | | | |
|---|---|---|---|
| 2009/0324256 A1* | 12/2009 | Kuzukami et al. | 398/200 |
| 2010/0181975 A1* | 7/2010 | Piselli et al. | 323/282 |
| 2011/0050339 A1* | 3/2011 | Ohkawara et al. | 330/149 |
| 2012/0045223 A1 | 2/2012 | Oku et al. | |
| 2013/0077149 A1* | 3/2013 | Tsunoda | 359/245 |
| 2014/0133867 A1* | 5/2014 | Fujimori et al. | 398/183 |
| 2014/0140707 A1* | 5/2014 | Akiyama et al. | 398/183 |
| 2014/0301742 A1* | 10/2014 | Chacinski et al. | 398/192 |

OTHER PUBLICATIONS

Beyene et al; The design of Continuous-time linear equalizer using model order reduction techniques; 2008; IEEE; pp. 187-190.*

* cited by examiner

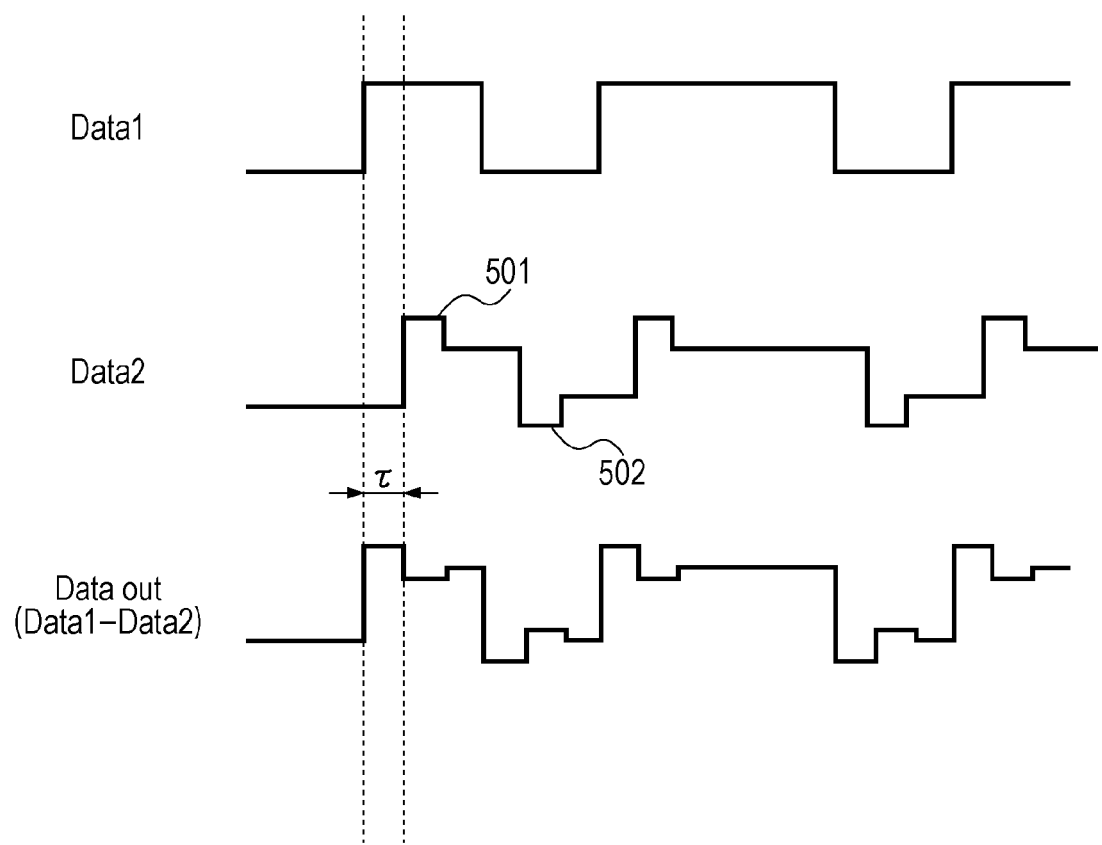

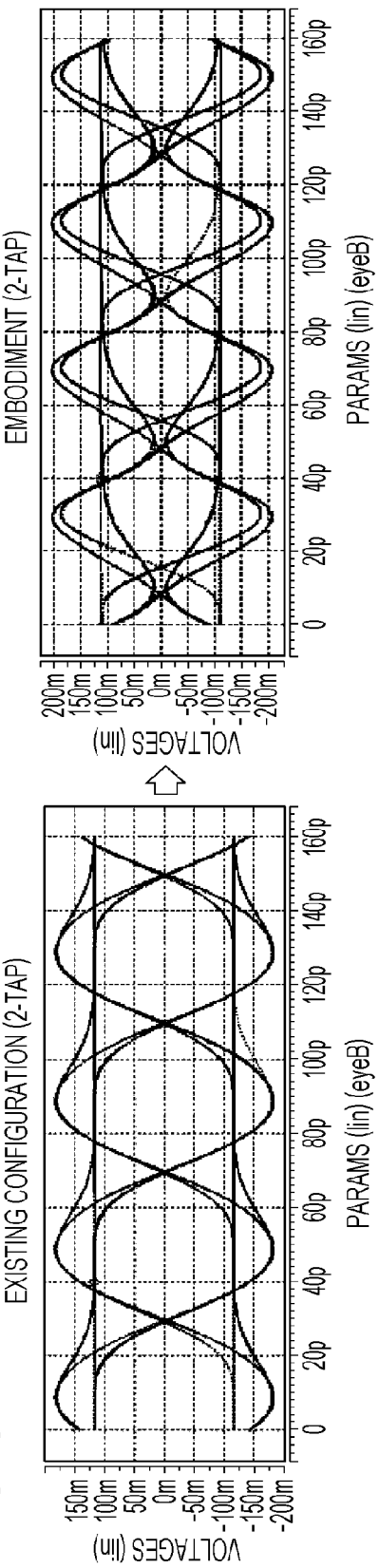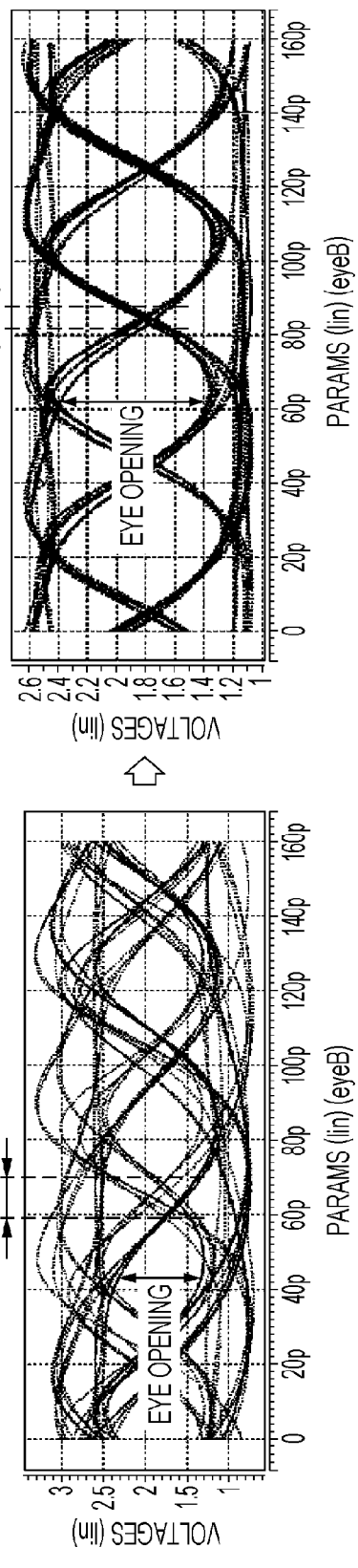
FIG. 8A
FIG. 8B

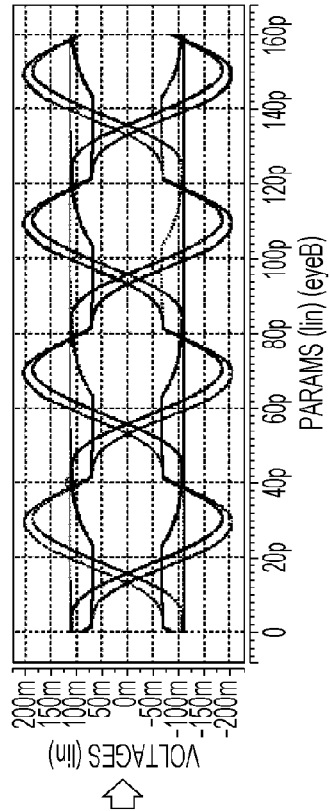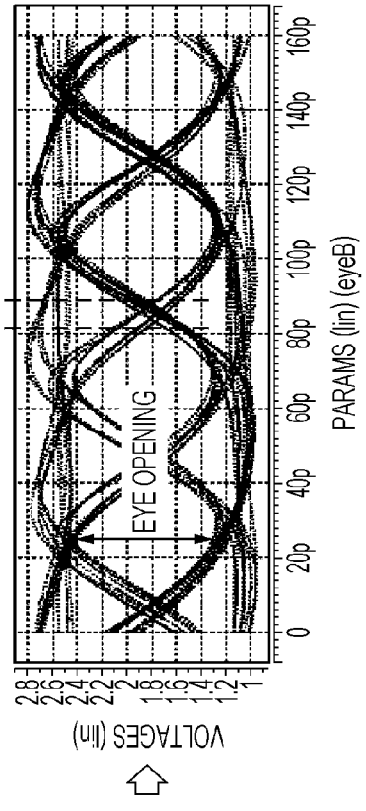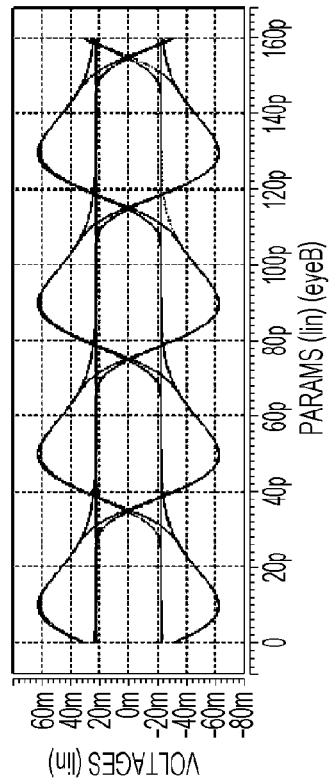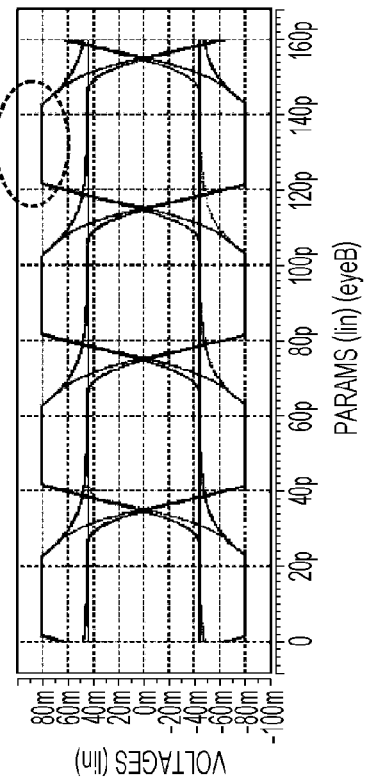
FIG. 9A
FIG. 9B

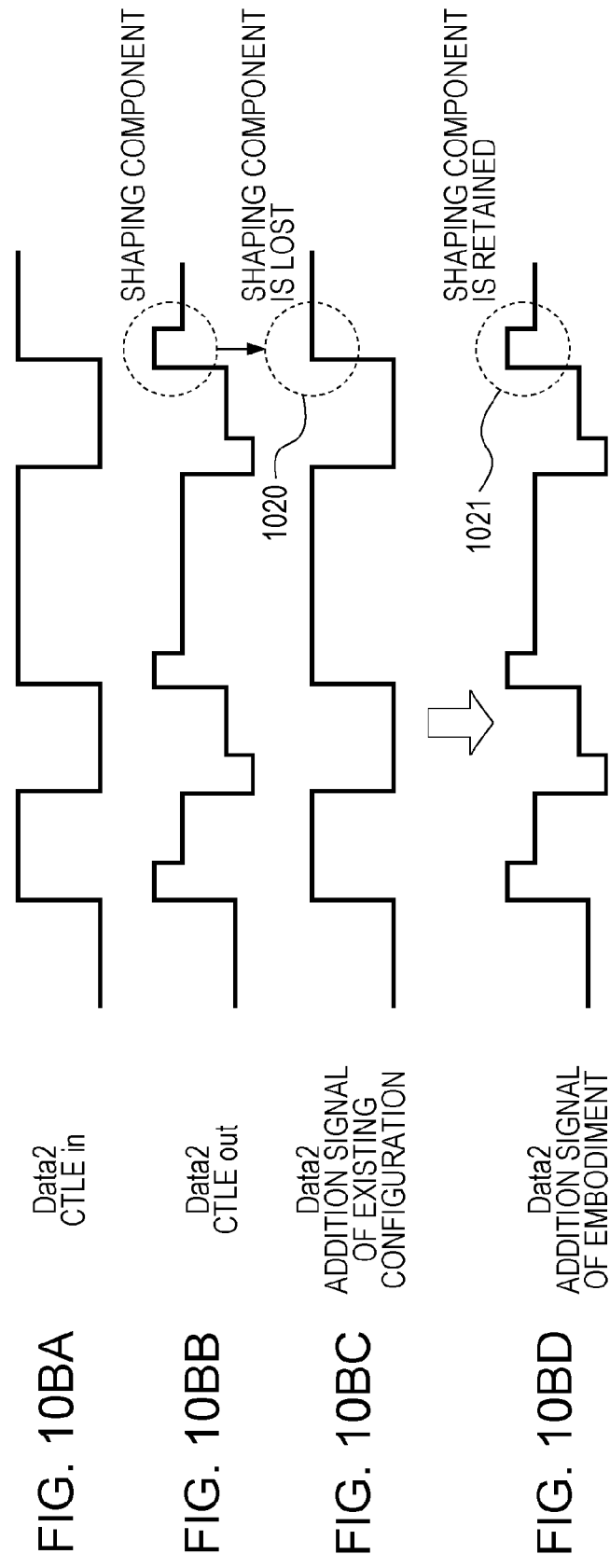

EMPHASIS SIGNAL GENERATING CIRCUIT

CROSS-REFERENCE TO RELATED APPLICATION

This application is based upon and claims the benefit of priority of the prior Japanese Patent Application No. 2012-253724, filed on Nov. 19, 2012, the entire contents of which are incorporated herein by reference.

FIELD

The embodiments discussed herein are related to emphasis signal generating circuits configured to compensate for waveform degradation.

BACKGROUND

Recently, in the field of communications, with the increase in data transmission amount, the data rate has been increased in order to transmit a large amount of data in a single signal. High-speed data transmission has an issue in that degradation of data such as intersymbol interference is likely to occur in cables, boards, output devices, and so forth. Thus, taking the degradation of signals into consideration, an emphasis signal is often used in which a portion where intersymbol interference of the signal is likely to occur is enhanced.

A method (FIR method) for generating such an emphasis signal is disclosed. This method includes splitting a signal into multiple signals, generating a delay difference between the split signals, and adding or subtracting one of the split signals having the delay difference to or from the other signal (see, for example, Japanese Laid-open Patent Publication No. 2004-088693). The use of this method is being considered not only in a communication system that uses electrical signals but also in a communication system that uses light. The use of this method is also being considered in order to compensate for insufficient speeds of laser diodes (LDs) and surface emitting lasers (VCSELs), which are photoelectric conversion devices (see, for example, Japanese Laid-open Patent Publication No. 2012-044396).

However, there is a low degree of freedom in the shaping of the waveform of an emphasis signal generated through the FIR method. Thus, as compared to a case where an emphasis signal is not used, an eye opening improves, but frequency dependence of phase characteristics such as group delay increases, and thus jitter may disadvantageously increase. To resolve such an issue, increasing the number of split taps may be considered, as discussed in Japanese Laid-open Patent Publication No. 2012-044396. However, increasing the number of taps leads to other issues such as an increased circuit size and increased power consumption.

SUMMARY

According to an aspect of the embodiment, an emphasis signal generating circuit includes a branch circuit configured to split a signal into a plurality of paths; a delay circuit provided in one or more of the paths into which the signal has been split by the branch circuit, the delay circuit being configured to delay one or more signals; a phase compensation circuit provided in one or more of the paths into which the signal has been split by the branch circuit, the phase compensation circuit having such characteristics that a transmission intensity of a signal is low in a low frequency band and is high in a high frequency band; and an addition/subtraction circuit configured to perform addition and/or subtraction of signals from the plurality of paths and output a result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates signal waveforms in respective units in the first embodiment;

FIGS. 8A and 8B illustrate simulation results of time waveforms (eye openings) of signals in the first embodiment;

FIGS. 9A and 9B illustrate simulation results of time waveforms (eye openings) of signals during a limiter operation in the first embodiment;

FIGS. 10BA to 10BD are waveform charts illustrating an influence of the addition/subtraction unit on an emphasis shaping component;

DESCRIPTION OF EMBODIMENTS

Figure 1:
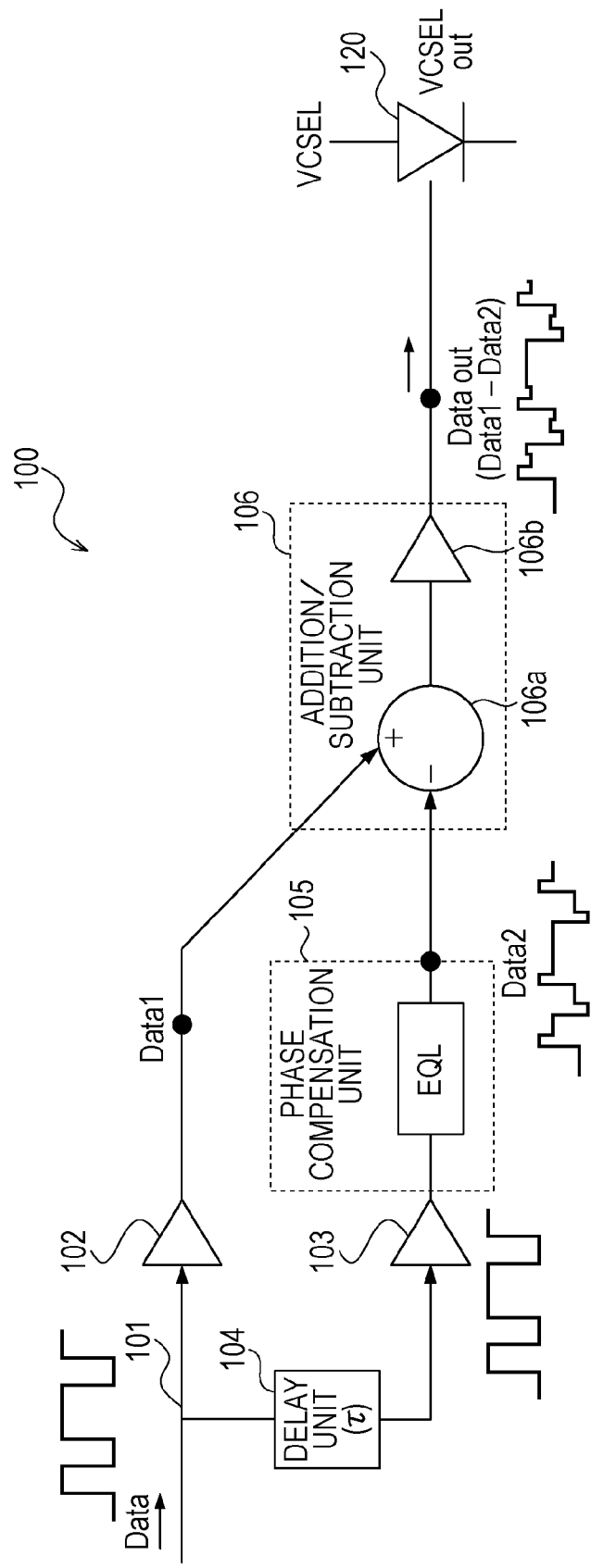
FIG. 1 illustrates an emphasis signal generating circuit according to a first embodiment.

Hereinafter, exemplary embodiments of the disclosed technique will be described in detail with reference to the accompanying drawings. FIG. 1 illustrates an emphasis signal generating circuit according to a first embodiment.

An emphasis signal generating circuit 100, for example, generates and outputs a drive signal (emphasis signal) for directly driving a light-emitting element (vertical cavity surface emitting laser (VCSEL)) 120 serving as a drive target.

This emphasis signal generating circuit 100 includes a branch unit 101, amplifiers 102 and 103, a delay unit 104, a phase compensation unit 105, and an addition/subtraction unit 106. The branch unit 101 splits an input signal (Data). In the example illustrated in FIG. 1, the branch unit 101 is configured to split the input signal into two paths (2-tap).

One output (path) of the branch unit 101 leads to the amplifier 102, and an output of the amplifier 102 is outputted to the addition/subtraction unit 106. The other output (path) of the branch unit 101 leads to the delay unit 104, and the input signal is delayed by a predetermined delay amount τ in the delay unit 104. An output of the delay unit 104 is amplified by the amplifier 103, and the resulting signal is subjected to phase compensation by the phase compensation unit 105 and is outputted to the addition/subtraction unit 106.

The addition/subtraction unit 106 includes a subtraction unit 106a and an amplifier 106b. The addition/subtraction unit 106 of the first embodiment has a subtraction function. The subtraction unit 106a subtracts one of the split input signals from the other. Specifically, the subtraction unit 106a subtracts an input signal (Data 2) that has been delayed by the delay unit 104 from an input signal (Data 1) that has not been delayed (Data 1−Data 2). Here, adjusting a predetermined addition ratio for each of the two signals through the respective paths allows the signal intensity to be adjusted and the waveform to be shaped. The amplifier 106b outputs an amplified output signal (Data out). This output signal (Data out) is outputted as an emphasis signal whose rise and fall have been enhanced. This emphasis signal serves as a drive signal for the light-emitting element 120.

In the configuration illustrated in FIG. 1, the output of the phase compensation unit 105 is subtracted in the addition/subtraction unit 106. Therefore, a path leading from the output of the phase compensation unit 105 to the addition/subtraction unit 106 is preferably a linear circuit or a linear amplification circuit. Alternatively, a non-linear circuit or a limiter circuit may also bring about a sufficient effect, which will be described later. The order in which the amplifier (buffer) 103 and the phase compensation unit 105 are connected to the delay unit 104 in the circuit illustrated in FIG. 1 may be switched as long as the circuit can retain the waveform of a phase compensation (equalizing) signal.

Figure 2:
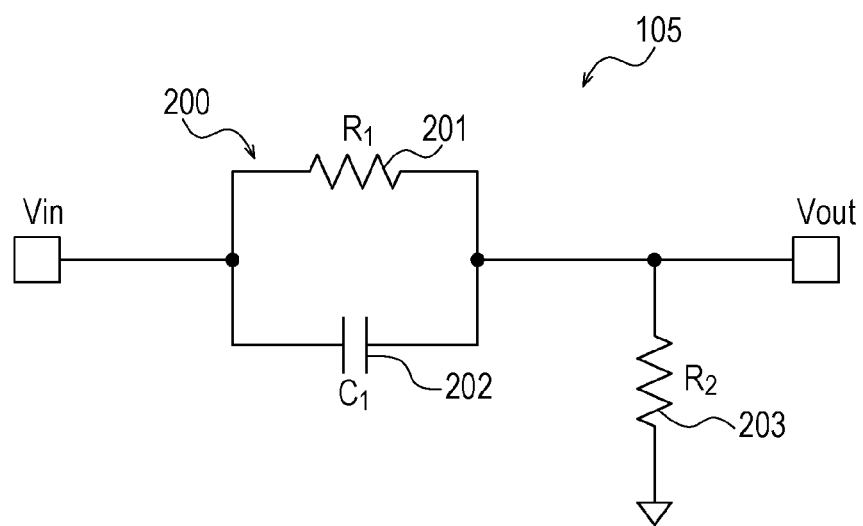
FIG. 2 illustrates a circuit example of a phase compensation unit.

FIG. 2 illustrates a circuit example of the phase compensation unit. The phase compensation unit 105 includes a circuit formed by a filter circuit 200, which is a parallel circuit including a resistor 201 and a capacitor 202, and a resistor 203. The filter circuit 200 is directly connected in a signal path (path). One end of the resister 203 is connected to the aforementioned circuit and the other end thereof is grounded. Frequency characteristics Vout of the phase compensation unit 105, for example, are expressed through Expression (1) below.

$$V_{out} \propto \frac{R_2(1 + j2\pi f C_1 R_1)}{R_1 + R_2 + j2\pi f C_1 R_1 R_2} V_{in} \quad (1)$$

Figure 3A:
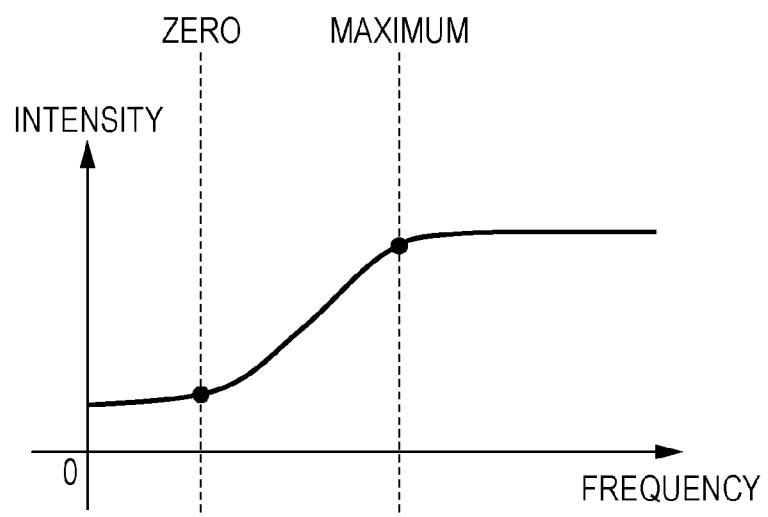
FIGS. 3AA and 3AB illustrate frequency characteristics of the phase compensation unit.
Figure 3A:
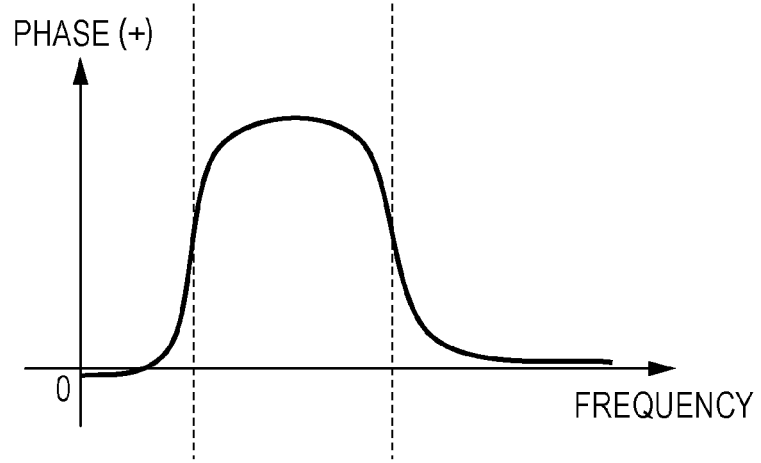
Figure 3B:
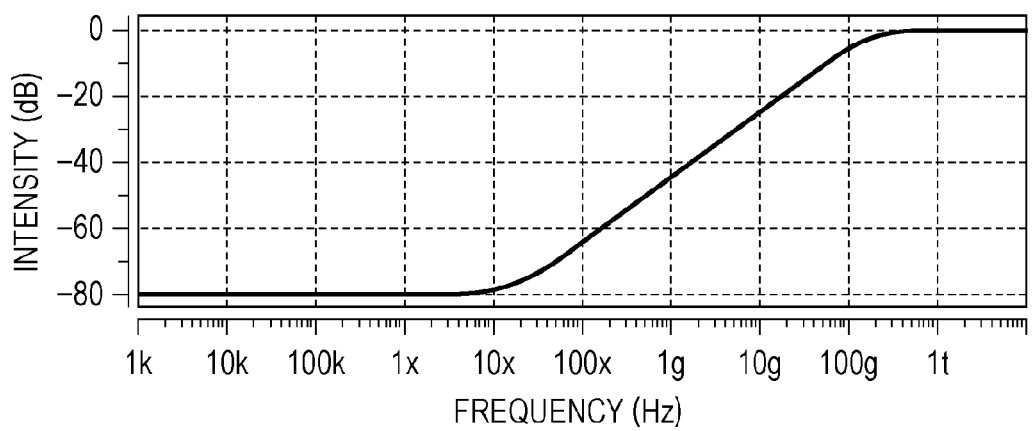
FIGS. 3BA and 3BB illustrate simulation results of frequency characteristics of the phase compensation unit.
Figure 3B:
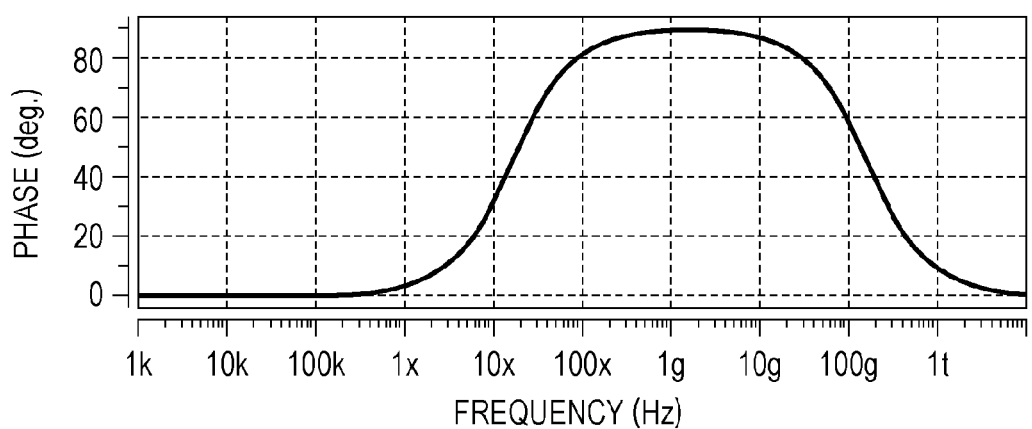

FIGS. 3AA and 3AB illustrate frequency characteristics of the phase compensation unit, and FIGS. 3BA and 3BB illustrate simulation results of frequency characteristics of the phase compensation unit. In FIGS. 3AA and 3BA, the horizontal axis represents frequency, and the vertical axis represents signal intensity. In FIGS. 3AB and 3BB, the horizontal axis represents frequency, and the vertical axis represents phase.

As illustrated in FIG. 3AA, the phase compensation unit 105 has, in terms of the intensity, "zero" at a low frequency and "maximum" at a high frequency. In addition, as illustrated in FIG. 3AB, the phase advances at a frequency around "zero". The phase advances the most at an intermediate position between "zero" and "maximum" and returns around "maximum". In this way, among the frequencies of an input signal, the phase compensation unit 105 has a low transmission intensity of a signal in a low frequency band and a high transmission intensity of a signal in a high frequency band.

Expression (1) above corresponds to the transmission characteristics. However, the embodiment is not limited to Expression (1) above, as long as a given configuration has the following characteristics. That is, "zero" and "maximum" appear in this order as the frequency increases, the phase advances around "zero" and returns around "maximum", and the transmission intensity of a signal is low in a low frequency band and is high in a high frequency band. The positions of "zero" and "maximum" are set in a lower frequency band than a 3 dB bandwidth of a drive device (VCSEL 120) to be driven through an output. Through this configuration, an emphasis signal that has "zero" and "maximum" in the band of the drive device and that is suitable for the drive device may be outputted.

Figure 4:
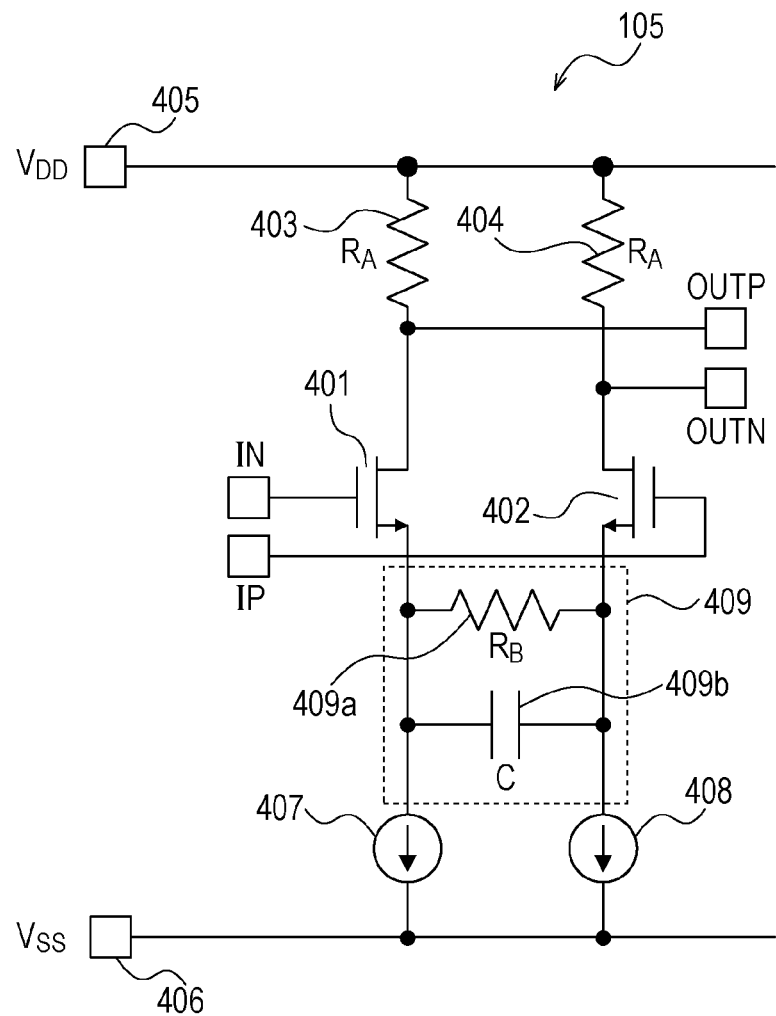
FIG. 4 illustrates another circuit example of the phase compensation unit.

FIG. 4 illustrates another circuit example of the phase compensation unit. FIG. 4 illustrates a circuit example of a continuous time linear equalizer (CTLE) serving as the phase compensation unit 105 having an amplification function. The circuit of the CTLE is not limited to the one illustrated in FIG. 4, and any existing circuit may be used instead.

In the exemplary circuit illustrated in FIG. 4, input terminals IN and IP are connected respectively to gates of FETs 401 and 402, and drains of the FETs 401 and 402 are connected to a power supply terminal 405, to which a power supply voltage $V_{DD}$ is to be applied, through respective resistors 403 and 404. The drains of the FETs 401 and 402 are also connected to output terminals OUTP and OUTN, respectively. Sources of the FETs 401 and 402 are connected respectively to current sources 407 and 408 that are provided between the pair of FETs 401 and 402 and a power supply terminal 406, to which a power supply voltage $V_{SS}$ is to be applied. A filter circuit 409 that includes a resistor 409a and a capacitor 409b is provided between the sources of the FETs 401 and 402.

When the impedance of the filter circuit 409 is denoted by Z, the CTLE circuit illustrated in FIG. 4 has an additive gain of $(gmR_4)/(1+gmZ)$ and has characteristics similar to those of the circuit illustrated in FIG. 2.

FIG. 5 illustrates signal waveforms in respective units illustrated in FIG. 1 in the first embodiment. On the basis of the characteristics of the phase compensation unit 105 illustrated in FIGS. 3AA, 3AB, 3BA, and 3BB, the output of Data 2 may be generated as a signal that has the delay amount τ relative to the input signal, whose intensity increases in a high speed band (high frequency band) 501 and decreases in a low speed band (low frequency band) 502. In this respect, the stated signal differs from an existing signal that is merely delayed by the delay amount τ relative to an input signal. Using this Data 2 having the delay amount τ makes it possible to obtain a drive signal (emphasis signal) whose waveform has been shaped as desired as an output signal (Data out=Data 1−Data 2).

Figure 6A:
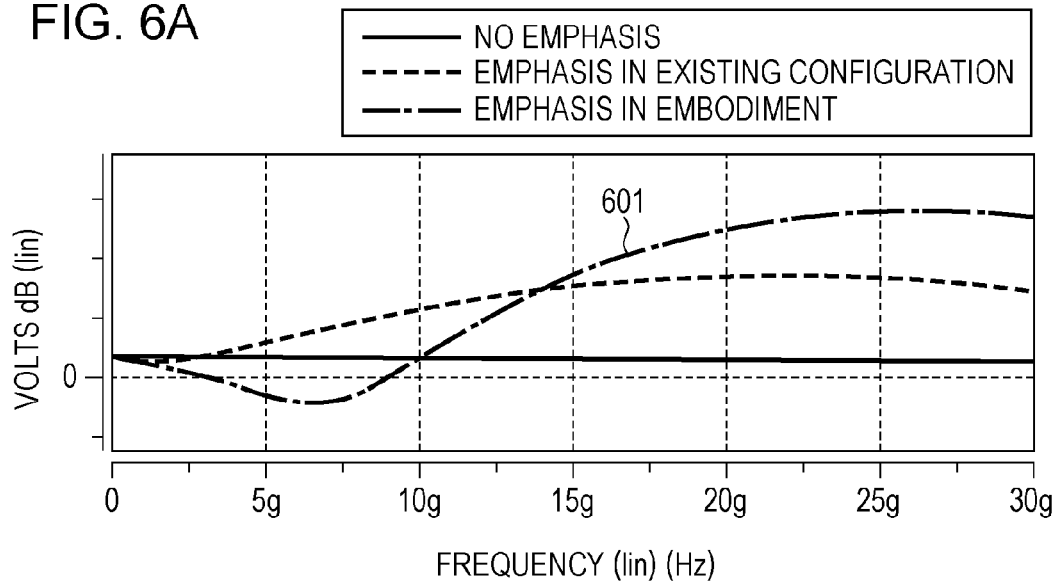
FIGS. 6A and 6B illustrate simulation results of frequency characteristics of an output signal in the first embodiment.
Figure 6B:
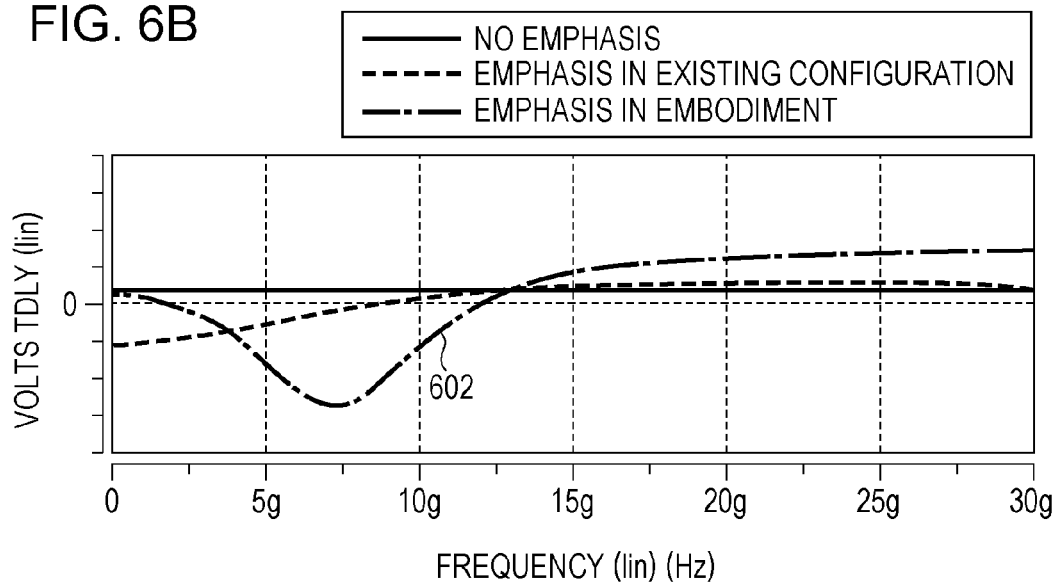

FIGS. 6A and 6B illustrate simulation results of frequency characteristics of an output signal in the first embodiment. FIG. 6A illustrates intensity characteristics of an output signal (Data out) illustrated in FIG. 1, and FIG. 6B illustrates group delay characteristics thereof. According to the first embodiment, the intensity characteristics illustrated in FIG. 6A make it possible to increase emphasis in a high frequency band 601. In addition, the group delay characteristics illustrated in FIG. 6B may generate a recess in the characteristics of a low frequency band 602 and enable improvement in phase characteristics through group delay compensation.

Figure 7A:
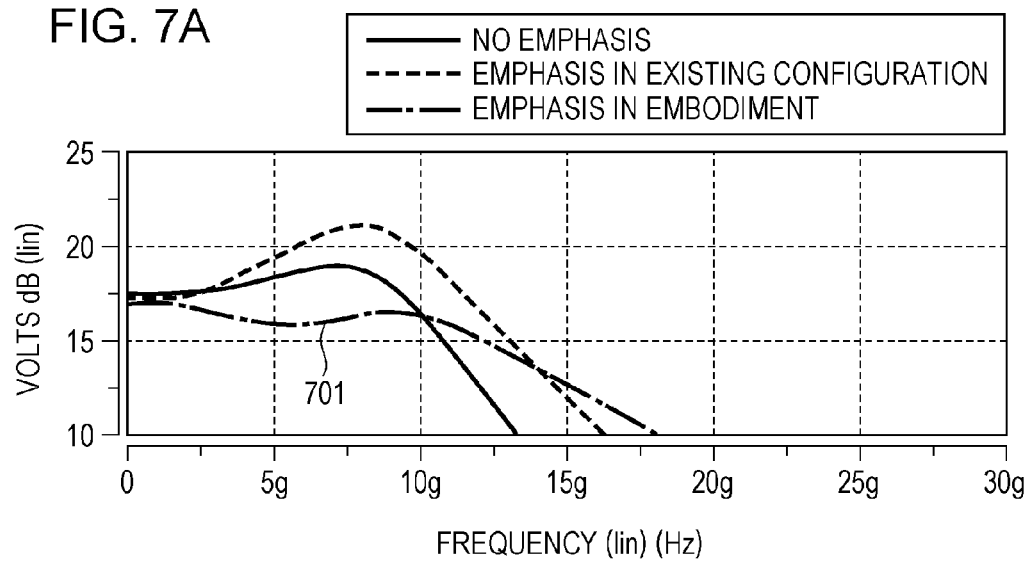
FIGS. 7A and 7B illustrate simulation results of frequency characteristics of a drive signal for a light-emitting element in the first embodiment.
Figure 7B:
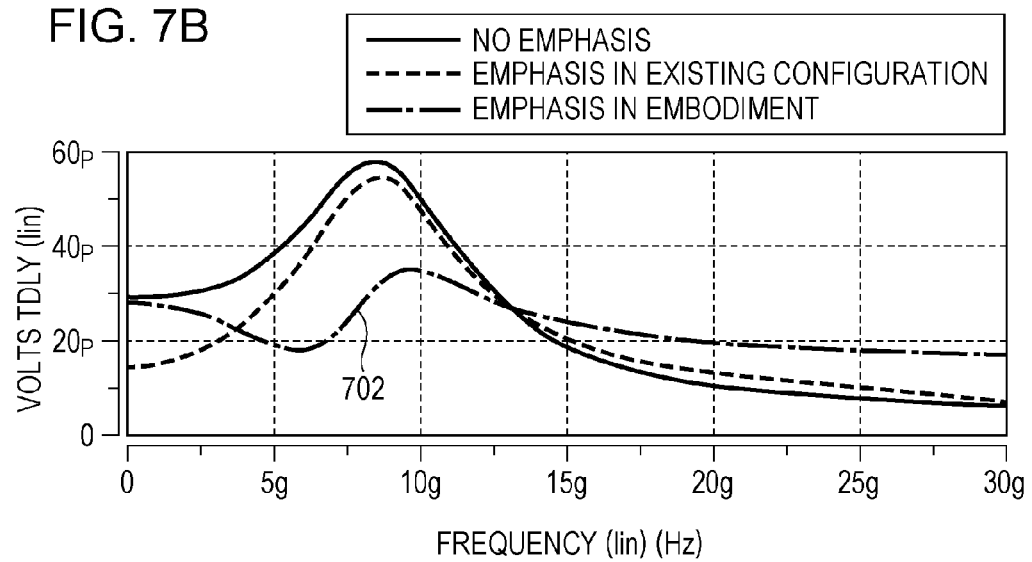

FIGS. 7A and 7B illustrate simulation results of frequency characteristics of a drive signal for a light-emitting element in the first embodiment. FIG. 7A illustrates intensity characteristics of a light emission state (VCSEL out) of the light-emitting element (VCSEL) 120 illustrated in FIG. 1, and FIG. 7B illustrates group delay characteristics thereof. According to the first embodiment, the intensity characteristics illustrated in FIG. 7A enable a characteristic line 701 that is more planar over the entire frequencies, and thus an eye opening may be made wider. In addition, the group delay characteristics illustrated in FIG. 7B also enable a characteristic line 702 that is more planar over the entire frequencies, and thus jitter may be reduced.

FIGS. 8A and 8B illustrate simulation results of time waveforms (eye openings) of a signal in the first embodiment. A waveform in the first embodiment (2-tap) is illustrated in the right half of each of FIGS. 8A and 8B, and a waveform of an existing 2-tap circuit is illustrated in the left half of each of FIGS. 8A and 8B.

When the output signals (Data out) illustrated in FIG. 8A are compared, the rise and the fall of the signals are both clearer in the first embodiment, and thus the eye opening may be made wider compared to that in the existing configuration. When the light emission states (VCSEL out) illustrated in FIG. 8B are compared, the eye opening may be made wider and the cross point is clearer in the first embodiment than in the existing configuration, and thus jitter may be reduced in the first embodiment.

FIGS. 9A and 9B illustrate simulation results of time waveforms (eye openings) of a signal during a limiter operation in the first embodiment. FIGS. 9A and 9B illustrate waveforms in the case of a non-linear circuit or in the case where a limiter operation occurs. Although the output of the phase compensation unit 105 provided in one of the taps and the addition/subtraction unit 106 are preferably linear circuits in order to retain the waveform as stated earlier, in reality, a non-linear circuit is employed or a limiter operation occurs. However, as illustrated in FIGS. 9A and 9B, even if a limiter operation occurs (portion 901 in FIG. 9B), an eye opening may be made wider and jitter may be reduced as can be seen from the waveform of the first embodiment (right half of FIG. 9B).

Figure 10A:
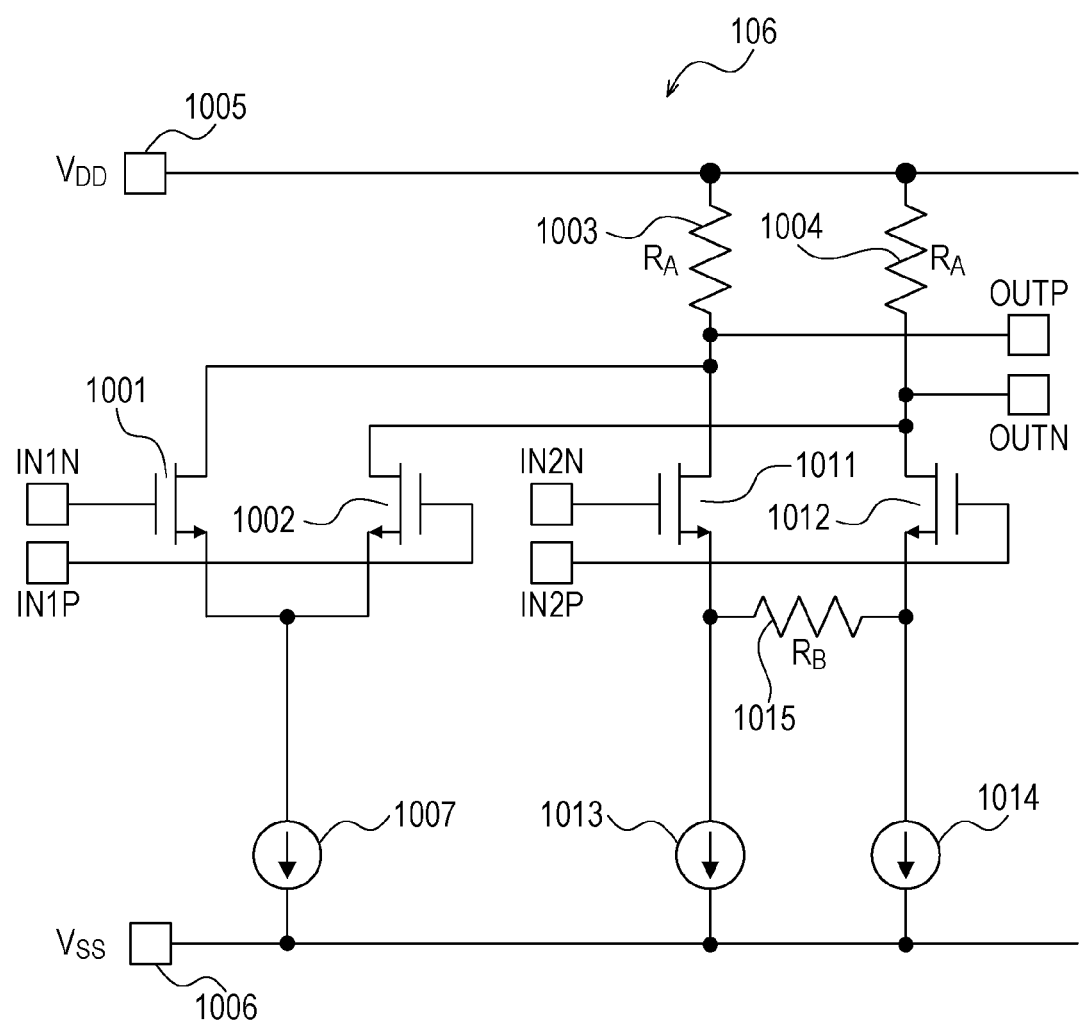
FIG. 10A illustrates an exemplary circuit configuration of an addition/subtraction unit.

FIG. 10A illustrates an exemplary circuit configuration of the addition/subtraction unit. In the addition/subtraction unit 106, input terminals IN1N and IN1P are connected respectively to gates of FETs 1001 and 1002, and drains of the FETs 1001 and 1002 are connected to a power supply terminal 1005, to which a power supply voltage $V_{DD}$ is to be applied, through respective resistors 1003 and 1004. The drains of the FETs 1001 and 1002 are also connected to output terminals OUTP and OUTN, respectively. Sources of the FETs 1001 and 1002 are connected to a current source 1007 that is provided between the pair of FETs 1001 and 1002 and a power supply terminal 1006, to which a power supply voltage $V_{SS}$ is to be applied (grounded source).

In addition, input terminals IN2N and IN2P are connected respectively to gates of FETs 1011 and 1012, and drains of the FETs 1011 and 1012 are connected to the power supply terminal 1005, to which the power supply voltage $V_{DD}$ is to be applied, through the respective resistors 1003 and 1004. The drains of the FETs 1011 and 1012 are also connected to the output terminals OUTP and OUTN, respectively. Sources of the FETs 1011 and 1012 are connected respectively to current sources 1013 and 1014 that are provided respectively between the FET 1011 and the power supply terminal 1006, to which the power supply voltage $V_{SS}$ is to be applied, and between the FET 1012 and the power supply terminal 1006.

FIGS. 10BA to 10BD are waveform charts illustrating an influence of the addition/subtraction unit on an emphasis shaping component. The emphasis additive gain of the circuit of the addition/subtraction unit 106 described above is expressed through $(gmR_A)/(1+gmR_B)$. If an ordinary addition circuit having the above-described configuration illustrated in FIG. 10A is used, even if a waveform is shaped by the phase compensation unit 105, the shaping component is degraded due to non-linearity of the addition circuit or a limiter operation, and thus an appropriate emphasis signal may not be obtained (portion 1020 in FIG. 10BC).

The gain of the addition circuit (subtraction circuit) depends on the magnitudes of the joint impedance $R_B$ of sources of a differential circuit and of the conductance gm of a transistor. Accordingly, as illustrated in FIG. 10A, a resistor 1015 is provided between the sources of the FETs 1011 and 1012 in the first embodiment. This configuration enables adjustment of the gain and an improvement in the linearity of the output signal. Then, as illustrated in FIG. 10BD, the shaping component of the waveform by the phase compensation unit 105 may be retained (portion 1021 in FIG. 10BD). Here, in the case of a bipolar transistor, the resistor 1015 may be provided between emitters of grounded emitter transistors.

According to the first embodiment described thus far, a phase compensation unit is provided in one or more of the paths of the split taps of the input signal. With this phase compensation unit, "zero" appears at a low frequency, and "maximum" appears at a high frequency. Further, the phase advances around "zero" and returns around "maximum". In addition, the phase compensation unit, among the frequencies of an input signal, has a low transmission intensity of a signal in a low frequency band and a high transmission intensity of a signal in a high frequency band. Such a phase compensation unit makes it possible to improve a waveform shaping function within a tap and, in particular, enables not only frequency intensity characteristics compensation but also phase compensation. Accordingly, the waveform of an emphasis signal or an LD output signal may be improved even with the same number of taps as the existing configuration.

Figure 11A:
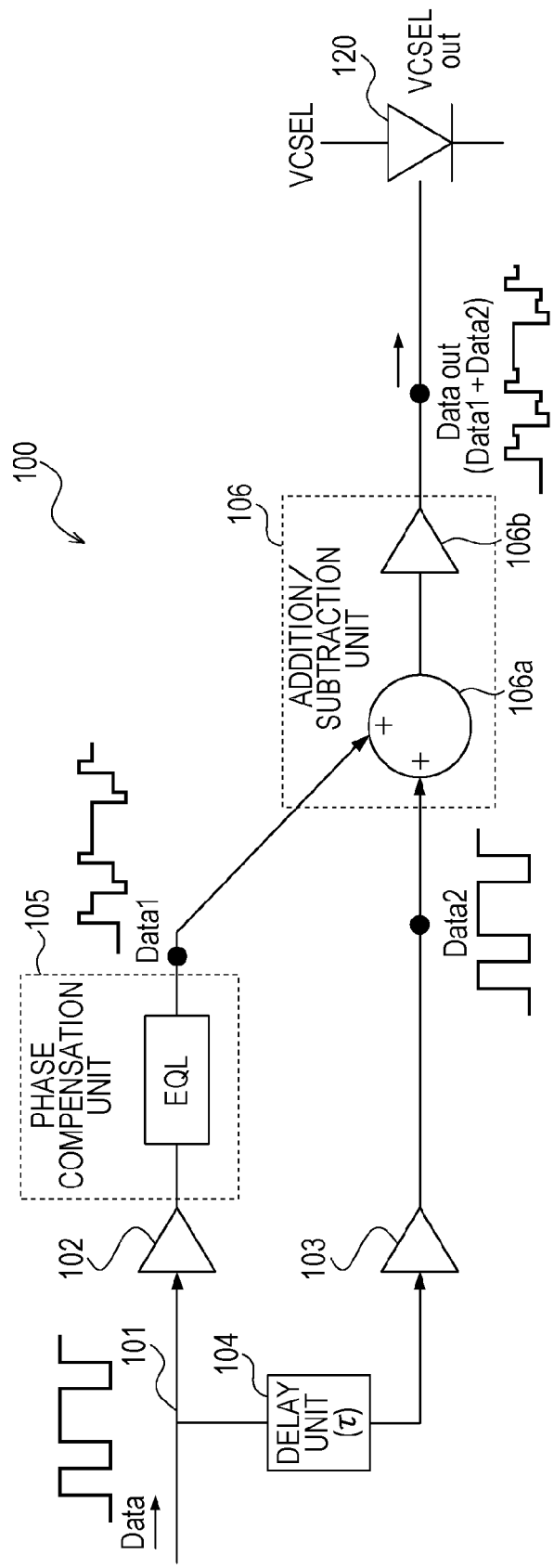
FIG. 11A illustrates an emphasis signal generating circuit according to a second embodiment (part 1)
Figure 11B:
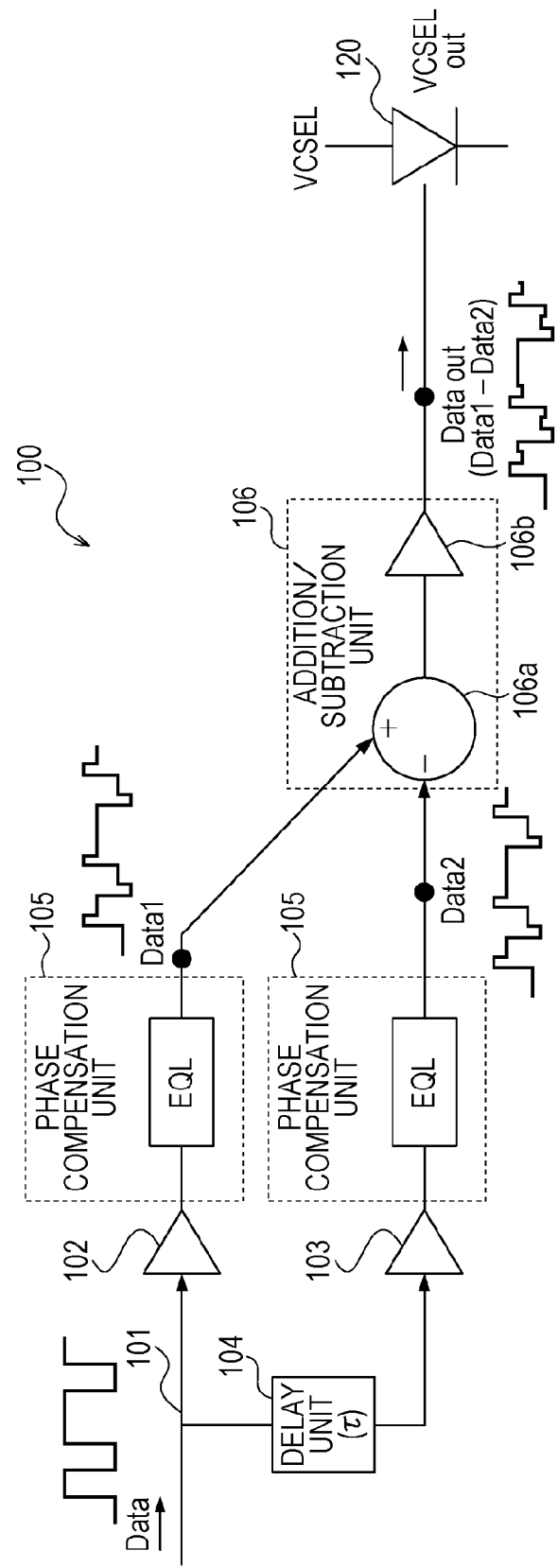
FIG. 11B illustrates another emphasis signal generating circuit according to the second embodiment (part 2)
Figure 11C:
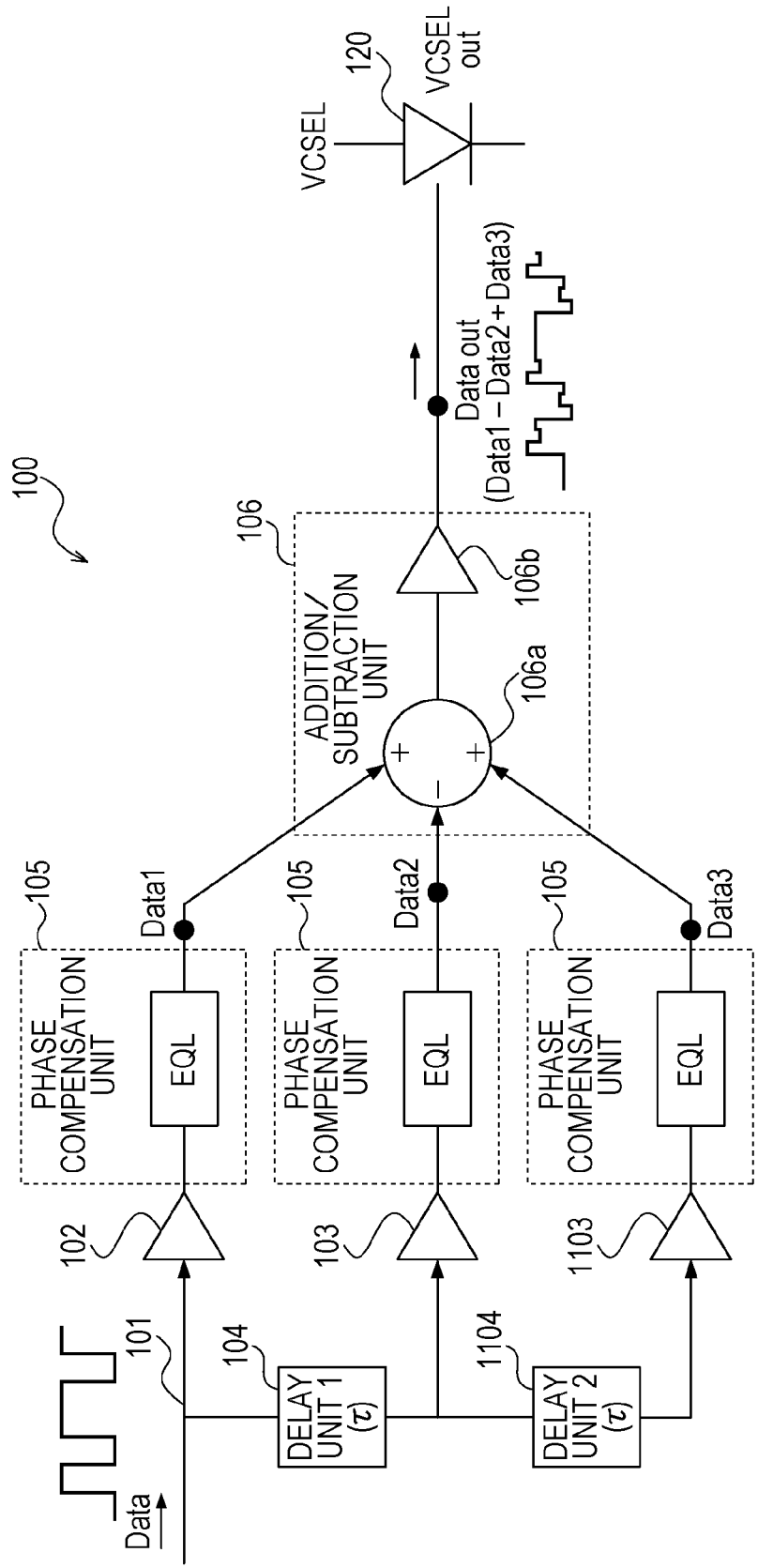
FIG. 11C illustrates yet another emphasis signal generating circuit according to the second embodiment (part 3)

A second embodiment has a configuration in which the disposition of the phase compensation unit 105 described in the first embodiment has been changed. FIGS. 11A, 11B, and 11C each illustrate an emphasis signal generating circuit according to the second embodiment. As illustrated in FIG. 11A, the phase compensation unit 105 may be provided in one of the split paths (i.e., in a tap that does not include the delay unit 104). In this case, the addition unit 106a of the addition/subtraction unit 106 adds the data pieces from the two taps (Data 1+Data 2). Alternatively, as illustrated in FIG. 11B, the phase compensation unit 105 may be provided in each of the two split taps.

FIG. 11C illustrates a three-tap configuration in which the branch unit 101 splits an input signal into three paths. The phase compensation unit 105 is then provided in each of the three taps. A delay unit 2 (1104) configured to further delay a signal that has been delayed by a delay unit 1 (104) and an amplifier 1103 are disposed in a path of a third tap. The output of the phase compensation unit 105 in the third tap is inputted to the addition/subtraction unit 106 to be added therein. Although the addition/subtraction unit 106 has performed subtraction in the first embodiment, as illustrated in FIG. 11C, depending on the combination of the phase compensation units 105, calculation in the addition/subtraction unit 106 is not limited to subtraction but may include addition.

According to the second embodiment described thus far, the phase compensation unit may be disposed in any of the split taps or may be disposed in all of the taps. Then, the waveform of an emphasis signal may be shaped by the phase compensation units disposed in the respective taps.

Figure 12A:
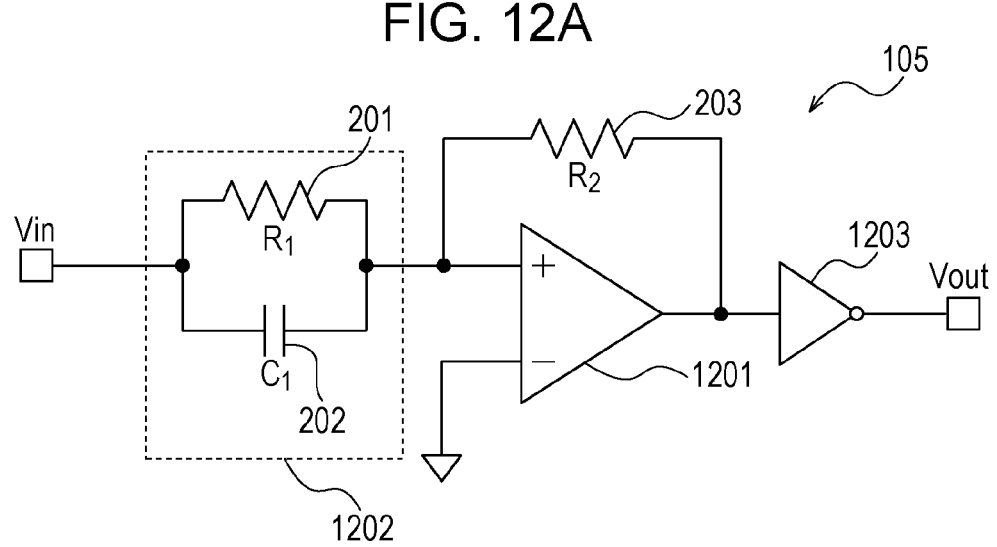
FIG. 12A illustrates an exemplary circuit configuration of a phase compensation unit according to a third embodiment (part 1)
Figure 12B:
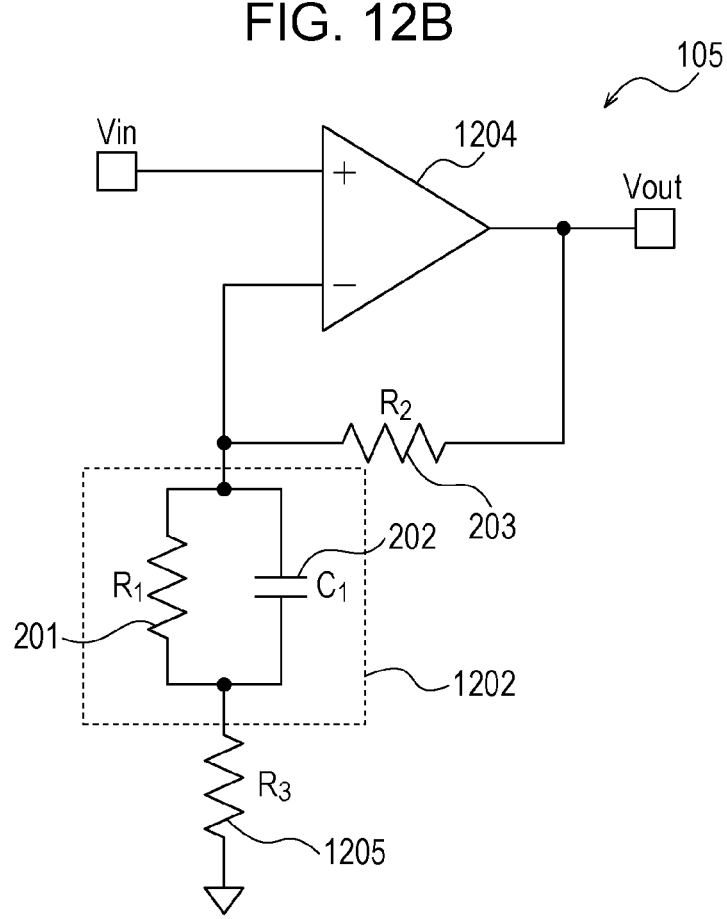
FIG. 12B illustrates another exemplary circuit configuration of the phase compensation unit according to the third embodiment (part 2)

In a third embodiment, other modifications of the phase compensation unit will be described. FIGS. 12A and 12B illustrate the other exemplary circuit configurations of the phase compensation unit according to the third embodiment. The phase compensation unit 105 illustrated in FIG. 12A includes an operational amplifier 1201. A parallel circuit (filter circuit) 1202 including the resistor 201 and the capacitor 202 has a similar configuration to that illustrated in FIG. 2. An output of the filter circuit 1202 is inputted to a non-inverting input (+) of the operational amplifier 1201, and the inverting input (−) of the operational amplifier 1201 is grounded. The output of the operational amplifier 1201 is fed back to the non-inverting input through the resistor 203. The output of the operational amplifier 1201 is inverted and outputted by an inverting element 1203.

In the phase compensation unit 105 illustrated in FIG. 12B, an input signal is inputted to a non-inverting input (+) of an operational amplifier 1204, and an inverting input (−) of the operational amplifier 1204 is grounded through a parallel circuit (filter circuit) 1202 including the resistor 201 and the capacitor 202 and a series circuit of a resistor 1205. An output of the operational amplifier 1204 is fed back to the inverting input through the resistor 203.

Each of these phase compensation units of the third embodiment is also a circuit that has a low transmission intensity in a low frequency band and a high transmission intensity in a high frequency band and has "maximum" at a point where the intensities of the low frequency band and the high frequency band change. The circuit configuration of the phase compensation unit is not limited to those described above, and any circuit configuration that has a similar function to those described above in terms of the intensity characteristics and the phase characteristics may be employed.

Figure 13:
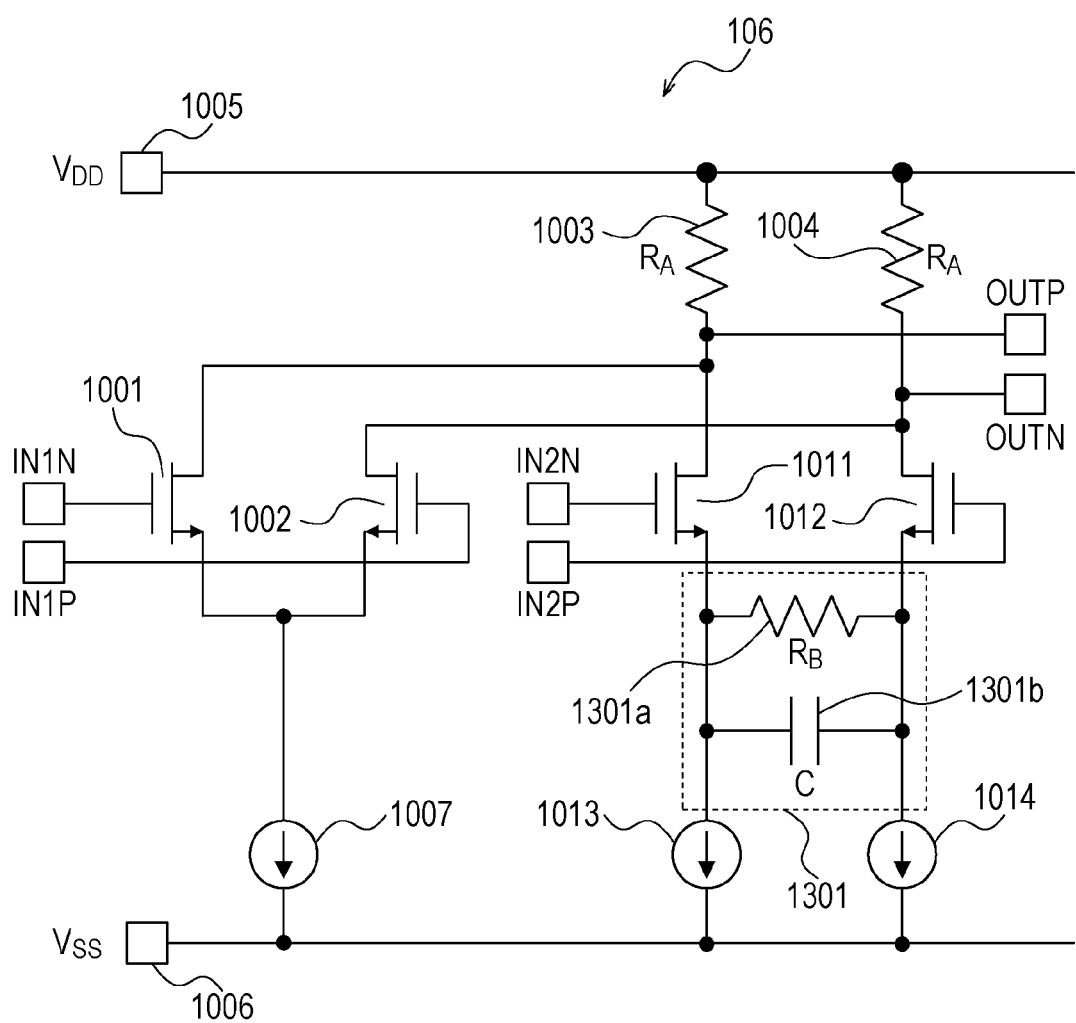
FIG. 13 illustrates a configuration example of an addition/subtraction unit having a phase compensation function according to a fourth embodiment.

FIG. 13 illustrates a configuration example of an addition/subtraction unit having a phase compensation function according to a fourth embodiment. The configuration illustrated in FIG. 13 is similar to the configuration of the addition/subtraction unit 106 illustrated in FIG. 10A. A difference, however, lies in that a parallel circuit (filter circuit) 1301 including a resistor 1301a and a capacitor 1301b is additionally provided between the sources of the FETs 1011 and 1012. According to the addition/subtraction unit 106 having such a configuration, the filter circuit 1301 that is similar to the one used in the phase compensation unit 105 is provided between the common sources of the FETs 1011 and 1012.

This configuration makes it possible to realize the addition/subtraction unit 106 having the function of the phase compensation unit 105, which allows the addition/subtraction and the phase compensation to be carried out simultaneously. Alternatively, as another configuration example, a filter circuit that is similar to the one described above may be provided in the delay unit 104 in a similar manner as described above, which makes it possible to realize the delay unit 104 having the function of the phase compensation unit 105. Here, in the case of a bipolar transistor, the filter circuit 1301 may be provided between emitters of grounded emitter transistors.

According to the embodiments described thus far, by providing a phase compensation unit in a tap obtained by splitting an input signal, the phase characteristics may be better compensated even with the same number of taps as the existing configuration, and a good emphasis signal and a good drive signal for a light-emitting element may be obtained.

Here, the existing configuration uses three or more taps in order to obtain emphasis signal characteristics equivalent to those of the embodiments. However, according to the embodiments, the number of taps may be reduced in comparison with the existing configuration, which allows the circuit size and the power consumption to be reduced.

Although an example in which an FET is used in a phase compensation unit or an addition/subtraction unit has been illustrated in the embodiments described above, the embodiments are not limited to the use of FETs, and a configuration in which another semiconductor device such as a bipolar transistor is used may yield similar effects as well.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An emphasis signal generating circuit, comprising:
  a branch circuit configured to split a signal into a plurality of paths;
  a delay circuit provided in one or more of the paths into which the signal has been split by the branch circuit, the delay circuit being configured to delay one or more signals;
  a phase compensation circuit provided in one or more of the paths into which the signal has been split by the branch circuit, the phase compensation circuit having such characteristics that a low intensity of a transmission signal appears in a low frequency band, a maximum intensity of the transmission signal appears in a high frequency band, and a phase of the transmission signal approaches from a near-zero degree in the low frequency band to near-90 degrees around a middle frequency band and returns to the near-zero degree in the high frequency band; and
  an addition/subtraction circuit configured to perform addition and/or subtraction of signals from the plurality of paths and output a result.
2. The emphasis signal generating circuit according to claim 1,
  wherein the phase compensation circuit is formed by connecting, in series, a filter circuit in which a resistor and a capacitor are connected in parallel to a signal path.
3. The emphasis signal generating circuit according to claim 1,
  wherein the phase compensation circuit employs a continuous time linear equalizer (CTLE).
4. The emphasis signal generating circuit according to claim 1,
  wherein the phase compensation circuit includes an amplification circuit and a filter circuit in which a resistor and a capacitor are connected in parallel.
5. The emphasis signal generating circuit according to claim 1,
  wherein the phase compensation circuit is a filter circuit including a resistor and a capacitor, the filter circuit being provided between sources of grounded source transistors of the addition/subtraction circuit, and wherein the addition/subtraction circuit carries out addition/subtraction of signals and phase compensation simultaneously.

6. The emphasis signal generating circuit according to claim 1,
wherein the phase compensation circuit sets positions of the near-zero intensity and the maximum intensity in a lower frequency band than a 3 dB bandwidth of a drive device to be driven through an output.

7. The emphasis signal generating circuit according to claim 1,
wherein an output of an emphasis signal outputted from the addition/subtraction circuit is supplied to a light-emitting element to directly drive the light-emitting element.

8. The emphasis signal generating circuit according to claim 1,
wherein a resistor is provided between sources of grounded source transistors of the addition/subtraction circuit to improve linearity of an output signal.

9. The emphasis signal generating circuit according to claim 1,
wherein a resistor is provided between emitters of grounded emitter transistors of the addition/subtraction circuit to improve linearity of an output signal.

* * * * *